(12) United States Patent
Sawai

(10) Patent No.: US 7,343,574 B2
(45) Date of Patent: Mar. 11, 2008

(54) METHOD OF SUPPORTING WIRING DESIGN, SUPPORTING APPARATUS USING THE METHOD, AND COMPUTER-READABLE RECORDING MEDIUM

(75) Inventor: Masayoshi Sawai, Kosai (JP)

(73) Assignee: Yazaki Corporation, Tokyo (JP)

( * ) Notice: Subject to any disclaimer, the term of this patent is extended or adjusted under 35 U.S.C. 154(b) by 404 days.

(21) Appl. No.: 11/075,705

(22) Filed: Mar. 10, 2005

(65) Prior Publication Data

US 2005/0203663 A1    Sep. 15, 2005

(30) Foreign Application Priority Data

Mar. 10, 2004   (JP)   ............ P 2004-067054

(51) Int. Cl.
G06F 17/50    (2006.01)

(52) U.S. Cl. .............................. 716/5; 716/6
(58) Field of Classification Search ............... 716/4–6, 716/15, 2, 18
See application file for complete search history.

(56) References Cited

U.S. PATENT DOCUMENTS

| | | | | |
|---|---|---|---|---|
| 7,124,069 B2 * | 10/2006 | Meuris et al. | ................. | 703/13 |
| 7,133,810 B2 * | 11/2006 | Butler et al. | ................... | 703/2 |
| 7,206,723 B2 * | 4/2007 | Sawai et al. | ................... | 703/1 |
| 2004/0172151 A1 * | 9/2004 | Sawai et al. | ................ | 700/103 |

FOREIGN PATENT DOCUMENTS

JP    2004-139570 A    5/2004
JP    2004-139974 A    5/2004

OTHER PUBLICATIONS

"Matrix Finite Element Method", B. Nath, translated by Takashi Yokoyama, Aug. 10, 1978; Brain Books Publication Co., Ltd., pp. 7-15.
"Mode Analysis and Dynamic Design", Kimihiko Yasuda, issued by the Corona Publishing Co., Ltd., Nov. 10, 1993.

* cited by examiner

Primary Examiner—Jack Chiang
Assistant Examiner—Binh Tat
(74) Attorney, Agent, or Firm—Sughrue Mion, PLLC

(57) ABSTRACT

A supporting apparatus includes a first setting unit which sets an initial shape of the linear structure, a providing unit which provides a finite element model of the linear structure, a second setting unit which sets a physical property and restriction conditions to the finite element model, a calculating unit which calculates a predictive shape of the finite element model which is in a physically balanced condition based on the physical property and the restriction conditions, and an outputting unit which outputs a calculation result of the calculating process of the predictive shape. The calculating unit calculates a first predictive shape in which a forced displacement destination of a first control point on the finite element model is set as the restriction conditions, and calculates a second predictive shape in which a forced displacement destination of a second control point on the finite element model is set as the restriction conditions.

7 Claims, 10 Drawing Sheets

FIG. 2

| DEGREE OF FREEDOM OF RESTRICTIONS / SUPPORT MEMBER | TRANSLATION IN THE DIRECTION OF X-AXIS | TRANSLATION IN THE DIRECTION OF Y-AXIS | TRANSLATION IN THE DIRECTION OF Z-AXIS | ROTATION AROUND X-AXIS | ROTATION AROUND Y-AXIS | ROTATION AROUND Z-AXIS |
|---|---|---|---|---|---|---|
| COMPLETE RESTRICTION — CONNECTOR | IMPOSSIBLE | IMPOSSIBLE | IMPOSSIBLE | IMPOSSIBLE | IMPOSSIBLE | IMPOSSIBLE |
| COMPLETE RESTRICTION — ELONGATED HOLE CLIP | IMPOSSIBLE | IMPOSSIBLE | IMPOSSIBLE | IMPOSSIBLE | IMPOSSIBLE | IMPOSSIBLE |
| ROTARY RESTRICTION — ROUND HOLE CLIP | IMPOSSIBLE | IMPOSSIBLE | IMPOSSIBLE | IMPOSSIBLE | IMPOSSIBLE | POSSIBLE |
| ROTARY RESTRICTION — CORRUGATED ELONGATED HOLE CLIP | IMPOSSIBLE | IMPOSSIBLE | IMPOSSIBLE | POSSIBLE | IMPOSSIBLE | IMPOSSIBLE |
| ROTARY RESTRICTION — CORRUGATED ROUND HOLE CLIP | IMPOSSIBLE | IMPOSSIBLE | IMPOSSIBLE | POSSIBLE | IMPOSSIBLE | POSSIBLE |
| COMPLETE RESTRICTION — BRANCH POINT | POSSIBLE | POSSIBLE | POSSIBLE | POSSIBLE | POSSIBLE | POSSIBLE |

FIG. 6A
FIG. 6B
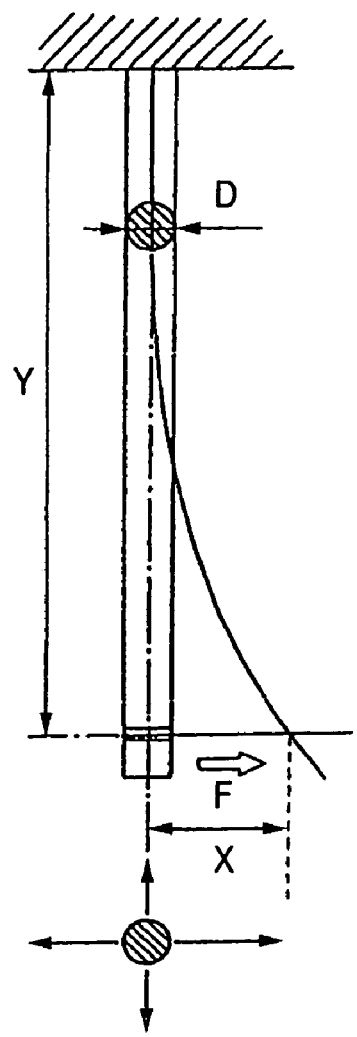
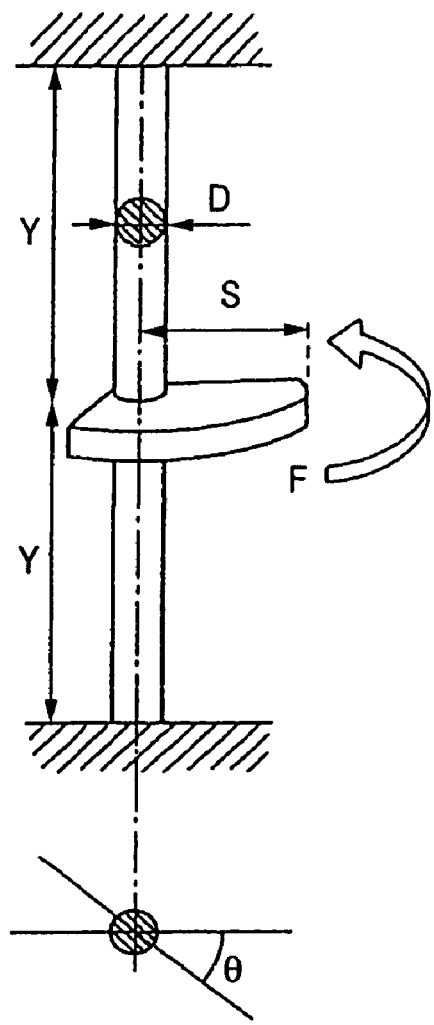

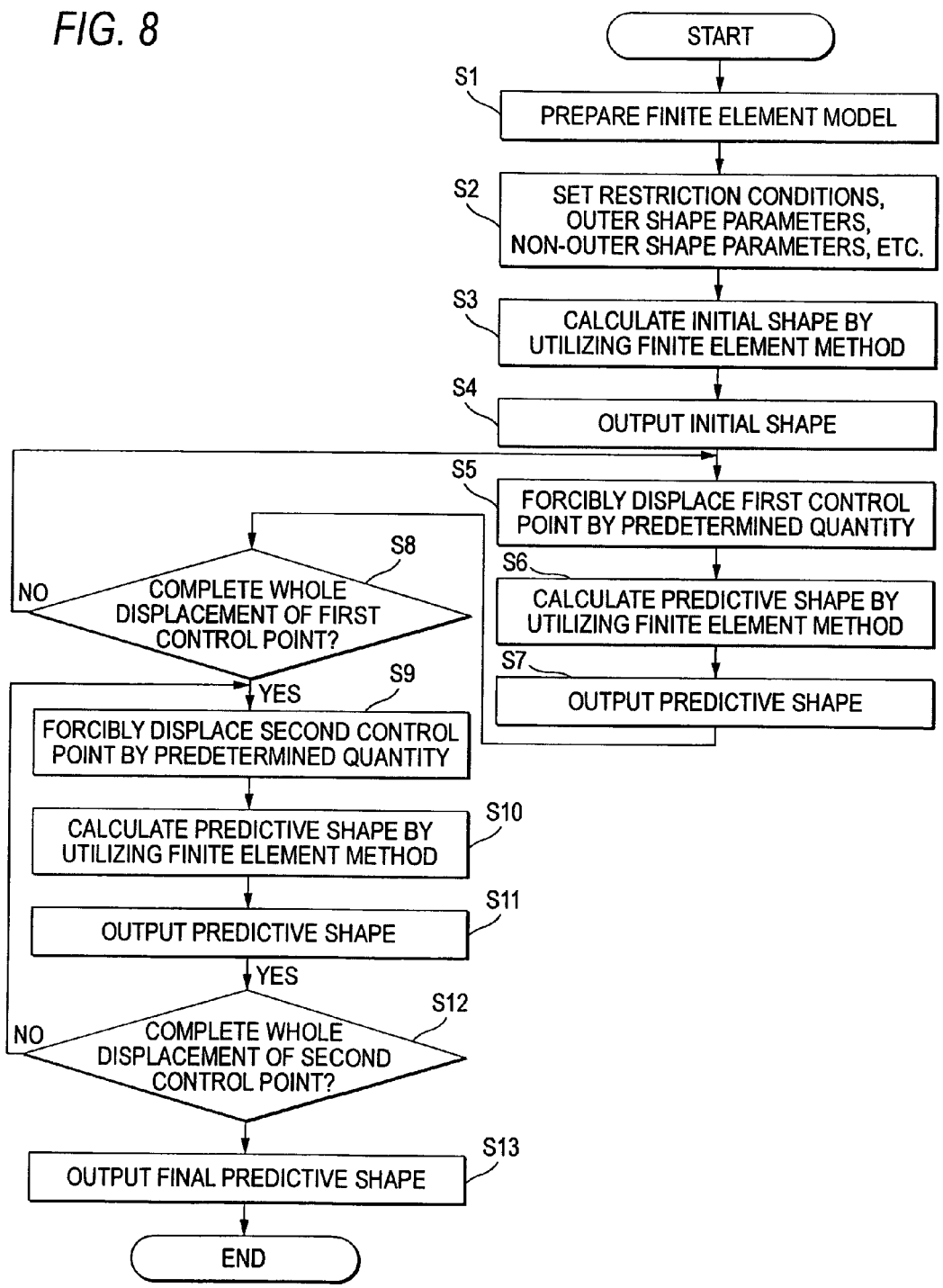

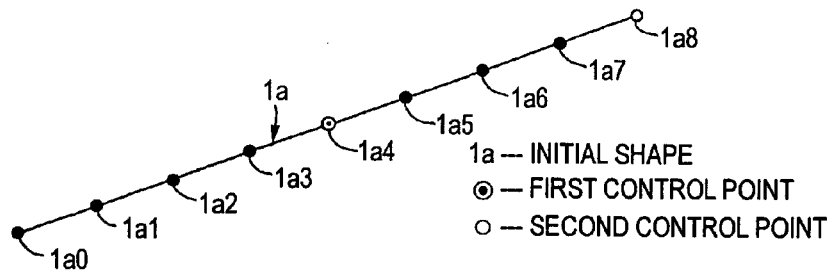
FIG. 9A
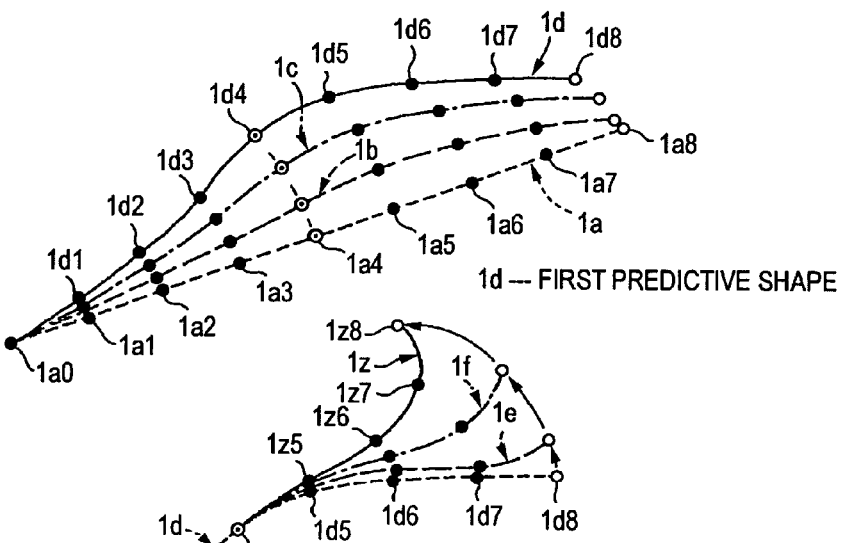
FIG. 9B
FIG. 9C
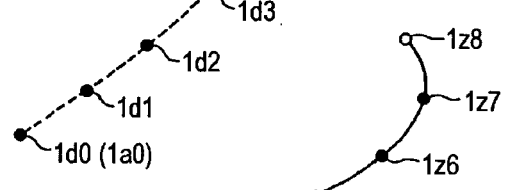
FIG. 9D
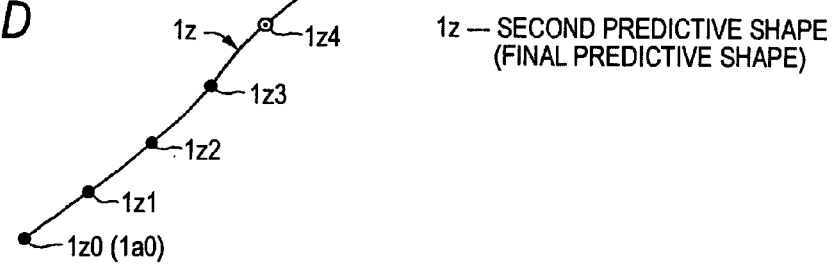

- ⊙ — FIRST CONTROL POINT
- ○ — SECOND CONTROL POINT

- ⊙ — FIRST CONTROL POINT
- ⊚ — SECOND CONTROL POINT
- ○ — THIRD CONTROL POINT

METHOD OF SUPPORTING WIRING DESIGN, SUPPORTING APPARATUS USING THE METHOD, AND COMPUTER-READABLE RECORDING MEDIUM

BACKGROUND OF THE INVENTION

The present invention relates to a method of supporting a wiring design of a linear structure, such as a wire harness, a supporting apparatus using the method, and a computer-readable recording medium.

A vehicle and the like is mounted with a plurality of electric parts, which are connected together by a so-called wire harness as a linear structure in which a plurality of linear members, such as electric wires, communication wires and the like are bundled in a binding member, such as an insulating lock and the like, and an outer armoring member, such as a tape. As shown in FIG. 1, connectors 2a, 2b, 2c, 2d joined to electric parts and the like are provided at end portions of a wire harness 1. Also, various kinds of clips 3a, 3b, 3c, 3d, and a branch point 4 are provided at intermediate portions of the wire harness. The branch lines of the wire harness 1, which form the sections of the wire harness 1 which extend from the end portions thereof to the branch point 4, have basically different number and kinds of structural filament members. Therefore, the thickness, length, density and the like of the branch lines are various.

The design for wiring such a wire harness in a vehicle and the like has been made in many cases by making calculations by using multipurpose analytic software called CAD (Computer Aided Design) and CAE (Computer Aided Engineering), or on the basis of a designer's experience and perception. However, since a linear structure, such as a wire harness and the like is diverse, merely using the multipurpose analytic software and merely relying upon a designer's experience do not meet the purpose, i.e., it is very difficult to design the linear structure by accurately anticipating the rigidity of the linear structure with respect to the bend and distortion of each portion thereof.

Under the above circumstances, the applicant of the present invention proposed by JP-A-2004-139974 and JP-A-2004-139570, and so forth a method of supporting an optimum wiring design by calculating a predictive shape of a linear structure with the physical property of a linear structure, such as a wire harness, i.e. a material thereof and the rigidity thereof with respect to the bend and distortion of each portion thereof taken into consideration, and by displaying the condition of the linear structure of gradual variation of from an initial shape to a predictive shape thereof, by utilizing a finite element process.

Here, the documents cited in the specification of the present invention will now be shown below.

JP-A-2004-139974
JP-A-2004-139570
"Matrix Finite Element Process" written by B. Nass, published by the Brain Book Publishing Co., Ltd., Aug. 10, 1978, p. 7 to 15.
"Mode Analysis and Dynamic Design" written by Hitohiko Yasuda, issued by the Corona Co., Ltd., Nov. 10, 1993, p. 54 to 56.

In order to practically provide the wire harness of an initial shape in a vehicle body as shown in, for example, FIG. 1, the connector 2a is first fixed to a predetermined portion of the vehicle body. An operational procedure for then fixing the connector 2b, then 2c, and then 2d of the wire harness to the vehicle body, i.e., an operational procedure for forcibly displacing the connectors of the wire harness 1 in order to predetermined portions of the vehicle body is taken.

As a result, the shape of the wire harness 1 is changed in multistages accordingly in the following manner, i.e., from the initial shape to another shape and kept as it is up to the time at which the connector 2a is fixed, then to another shape and kept as it is up to the time at which the connector 2b is fixed, and then to another shape and kept as it is up to the time at which the connector 2c is fixed.

The methods disclosed in JP-A-2004-139974 and JP-A-2004-139570 are very excellent methods in that the methods are capable of accurately calculating a predictive shape of a linear structure with the physical property of a linear structure, i.e. the material thereof and the rigidity of each portion with respect to the bend and distortion thereof taken into consideration, and accurately displaying the condition of the deformation of the shape. However, these Patent Documents do not refer to the predicting of the shape of the linear structure on the assumption that the above-mentioned multistage deformation occurs. In a practical operation, the wire harness in an initial shape reaches a final shape via a multistage deformation in most cases. Accordingly, the development of a wiring design method based on this assumption and capable of accurately predicting the shape of a linear structure is waited for.

SUMMARY OF THE INVENTION

In view of the present condition mentioned above, an object of the present invention is to provide a method, which is more in conformity with the realities of the techniques, of supporting a wiring design of a linear structure, a supporting apparatus using the method and a computer readable-recording medium which are capable of accurately grasping the condition of a linear structure the shape of which varies to a final shape via a multistage changed shapes.

In order to achieve the above object, according to the present invention, there is provided a method of supporting an optimum wiring design of a linear structure, comprising:

setting an initial shape of the linear structure;

providing a finite element model of the linear structure, the finite element model being formed as an elastic body having a plurality of combined beam elements which retain linearity;

setting a physical property and restriction conditions of the linear structure to the finite element model;

calculating a predictive shape of the finite element model which is in a physically balanced condition based on the physical property and the restriction conditions; and outputting a calculation result of the calculating process of the predictive shape, wherein the calculating process of the predictive shape includes:

calculating a first predictive shape in which a forced displacement destination of a first control point on the finite element model corresponding to the initial shape is set as one of the restriction conditions; and calculating a second predictive shape in which a forced displacement destination of a second control point, which is different from the first control point, on the finite element model corresponding to the first predictive shape is set as one of the restriction conditions.

Preferably, the calculating process of the second predictive shape is performed under the first control point is completely restricted or rotationally restricted to the forced displacement destination.

Preferably, the calculating process of the predictive shape further includes a process of calculating a third predictive shape in which a forced displacement destination of a third control point, which is different from any of the first control point and the second control point, on the finite element model corresponding to the second predictive shape is set as one of the restriction conditions.

Preferably, the control points are displaced gradually by a predetermined quantity at a time toward the respective forced displacement destinations.

According to the present invention, there is also provided a supporting apparatus for supporting an optimum wiring design, comprising:

a first setting unit which sets an initial shape of a linear structure;

a providing unit which provides a finite element model of the linear structure, the finite element model being formed as an elastic body having a plurality of combined beam elements which retain linearity;

a second setting unit which sets a physical property and restriction conditions to the finite element model of the linear structure;

a calculating unit which calculates a predictive shape of the finite element model which is in a physically balanced condition based on the physical property and the restriction conditions; and an outputting unit which outputs a calculation result of the calculating process of the predictive shape, wherein the calculating unit calculates a first predictive shape in which a forced displacement destination of a first control point on the finite element model corresponding to the initial shape is set as one of the restriction conditions, and calculates a second predictive shape in which a forced displacement destination of a second control point, which is different from the first control point, on the finite element model corresponding to the first predictive shape is set as one of the restriction conditions.

According to the present invention, there is also provided computer-readable recording medium for causing a computer to execute the method of supporting an optimum wiring design of a linear structure set forth in the above descriptions.

In the above configuration and method, the object linear structure is formed as an elastic body in which a plurality of linearity-retained beam elements are combined with each other, and a finite element model of this linear structure is prepared, a predictive shape corresponding to the physical property and restriction conditions given to this finite element model being calculated, the results of this calculation being outputted. Especially, a predictive shape set when the forced displacement destination at the first control point on the finite element model corresponding to the initial shape is given as one of the restriction conditions is calculated as a first predictive shape. A predictive shape set when the forced displacement destination of the second control point, which is different from the first control point, on the finite element model corresponding to the first predictive shape is given as one of the restriction conditions is calculated as a second predictive shape. These first predictive shape and second predictive shape and the initial predictive shape are outputted. Therefore, the condition in which the predictive shape of the linear structure reaches a final shape via the multistage deformed shapes can be grasped, and the wiring a design of a linear structure in conformity with the realities of the techniques can be attained.

According to the above configuration and method, a second predictive shape is calculated on the assumption that the first control point is completely restricted or rotationally restricted by the forcible deformation destination. Therefore, a multistage prediction of the shape based on the assumption that a complete restriction type support member and a rotational restriction type support member both of which are used in many cases in practice can be made, and, moreover, the wiring design of a linear structure in conformity with the realities of the techniques can be attained.

According to the above configuration and method, the multistage prediction of the shape based on the assumption of the forced deformation destination of a third control point which is different from any of the first control point and second control point is made. Therefore, the wiring design of a linear structure in conformity with the realities of the techniques can further be attained.

According to the above configuration and method, the control points are displaced gradually by a predetermined quantity at a time to their respective forced displacement destinations, so that the multistage deformation can be grasped more in detail. Therefore, the discussion and the like of the procedure for operations can be made, and the wiring design of the linear structure more in conformity with the realities of the techniques can be attained.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2 is a drawing showing the relation between the typical support members fixed to the wire harness and the degree of freedom of restrictions;

FIG. 6A is a drawing showing the measurement of the geometrical moment of inertia and longitudinal elastic modulus; and FIG. 6B is a drawing showing the measurement of the polar moment of area and lateral elastic modulus;

FIG. 8 is a flow chart showing the procedure for the process according to the embodiment of the present invention;

FIG. 9A to FIG. 9D are drawings showing the deforming of the wire harness in the course of each process of FIG. 8.

DETAILED DESCRIPTION OF THE PREFERRED EMBODIMENTS

Figure 1:
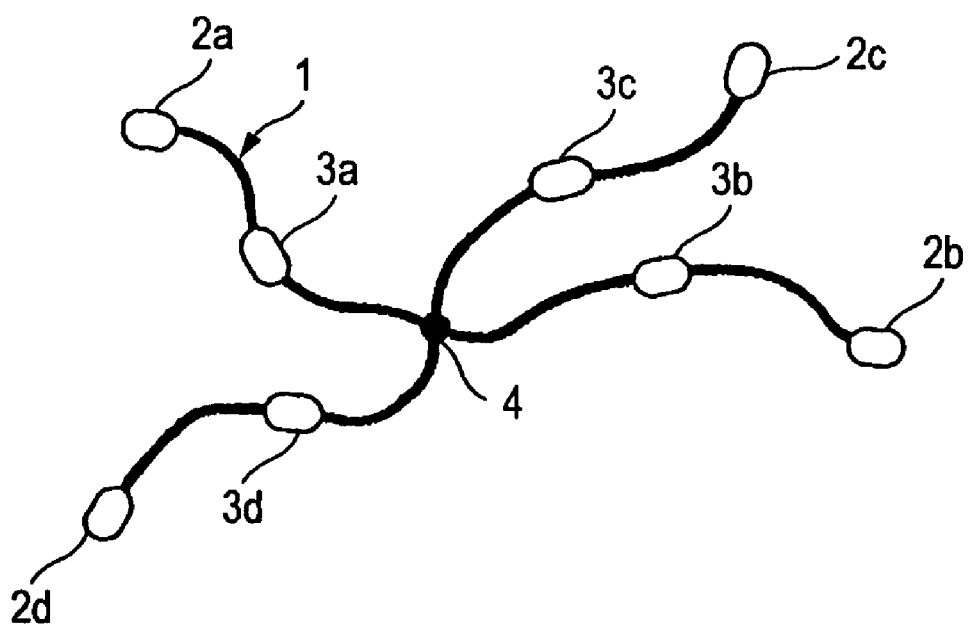
FIG. 1 is a drawing schematically showing an example of an object wire harness.

The embodiments of the present invention will now be described on the basis of the drawings. First, an example of a wire harness as an object linear structure and a typical support member will be described in FIG. 1 and FIG. 2. FIG. 1 is a drawing schematically showing an example of an object wire harness. FIG. 2 is a diagram showing the relation between typical support members fixed to the wire harness and the degree of freedom of restrictions.

Connectors 2a, 2b, 2c, 2d for connecting electric parts (not shown) are mounted at both end portions of the wire harness 1. Various kinds of clips 3a, 3b, 3b, 3c are mounted to intermediate portions of the wire harness 1, which further has a branch point 4. Since the branch lines of the wire harness 1 have basically different number and kind of structural filament members, the thickness, length, elasticity, density and the like thereof are also different.

The connectors 2a, 2b, 2c, 2d are detachably joined to fixed portions and predetermined portions, which are in accordance with the part fixing direction, of connectors on the side of an electric part, and the end portions of the wire harness are thereby completely restricted. The clips 3a, 3b, 3c, 3e completely restrict or rotationally restrict predetermined portions of the wire harness with respect to predetermined portions of a body and a stay of a vehicle.

A description of the clips will now be added. The clips basically include an elongated hole clip, and a round hole clip. A round hole clip is also called a rotary clip, and has a base seat portion for retaining the wire harness, and a support leg inserted into a round fixing hole provided in a stay and the like. The round hole clip can be rotated around a Z-axis (perpendicular direction of a fixing portion).

The elongated hole clip is also called a fixed clip, and has a base seat portion for retaining the wire harness, and a support leg inserted into an elongated fixing hole provided in a stay and the like. This support leg has an elongated hole-like cross-sectional shape substantially identical with the cross-sectional shape of the fixing hole. The elongated hole clip is non-rotatable around the Z-axis.

The elongated hole clips and round hole clips include corrugated elongated hole clips rotatable around an X-axis (longitudinal direction of the wire harness), and corrugated round hole clips. The degrees of freedom of restriction in the axial directions and in the directions around the axes of such clips are as shown in FIG. 2.

Referring to FIG. 2, the X-axis, Y-axis and Z-axis correspond to three straight lines in a right-hand local coordinate system on joints (or called nodes as well) on the wire harness. For example, the Z-axis is set so that the Z-axis is in alignment with the clip axis. These setting methods can be changed suitably depending upon the functions in use. The drawing also shows for reference the degrees of freedom of restriction of the branch point. A joint, though it is not shown in the drawing, set arbitrarily on the portion of the wire harness which is other than the above-mentioned restriction point is basically completely free. Such a degree of freedom of restriction is set on each joint for making calculations of predictive paths which will be described later.

Figure 3A:
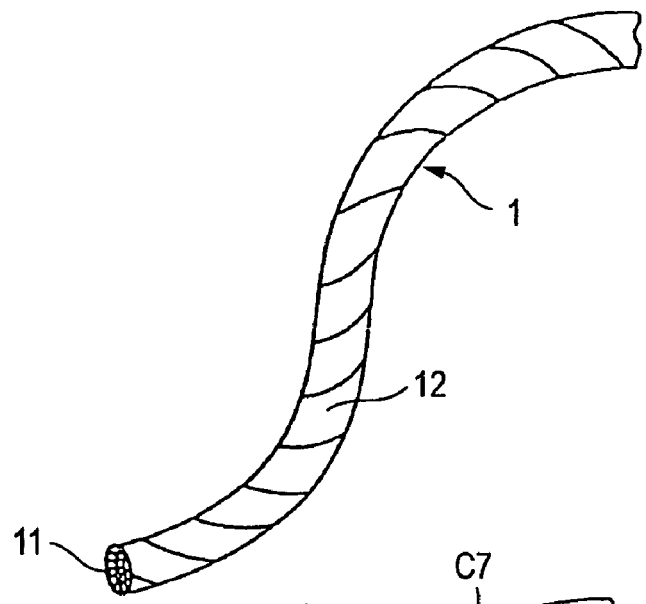
FIG. 3A is a drawing showing an outer appearance of the wire harness.
Figure 3B:
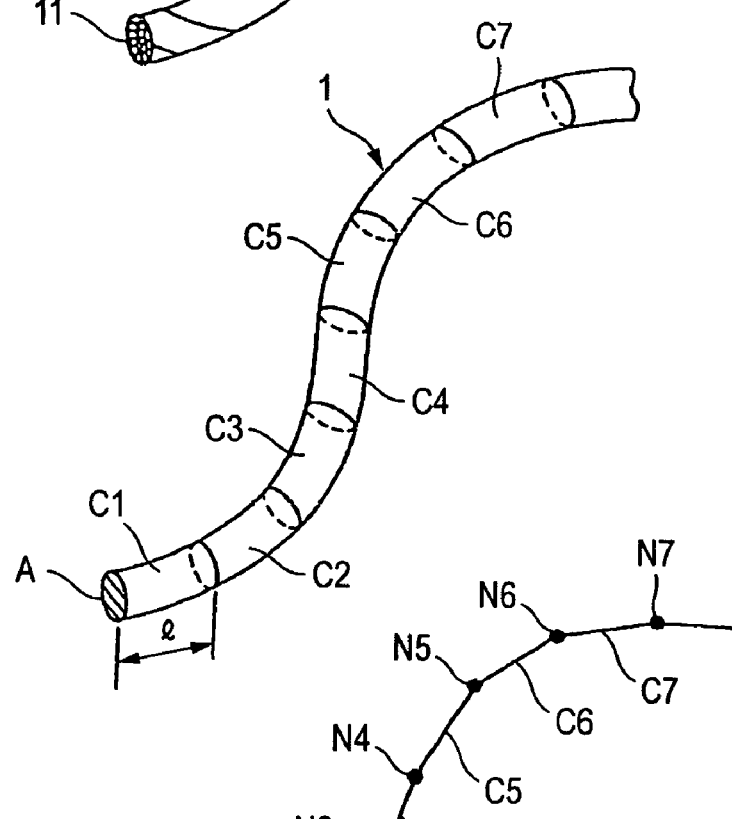
FIG. 3B is a drawing showing the digitization form of the wire harness of FIG. 3A.
Figure 3C:
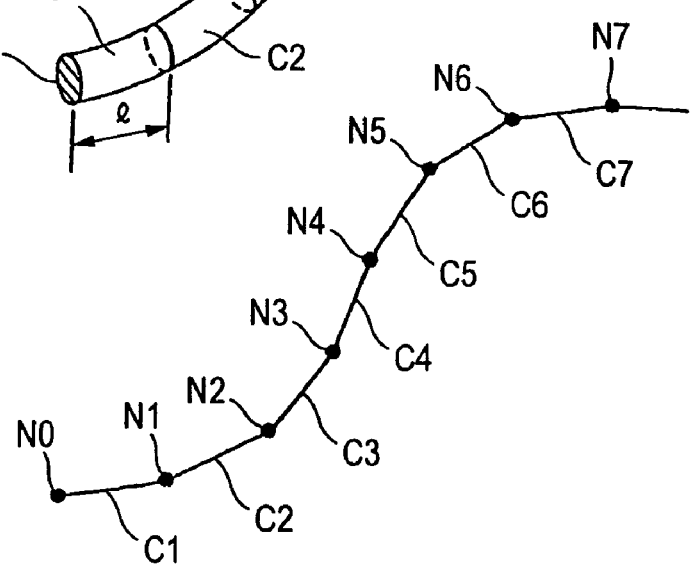
FIG. 3C is a drawing showing the wire harness of FIG. 3A by beam elements and nodes.
Figure 4:
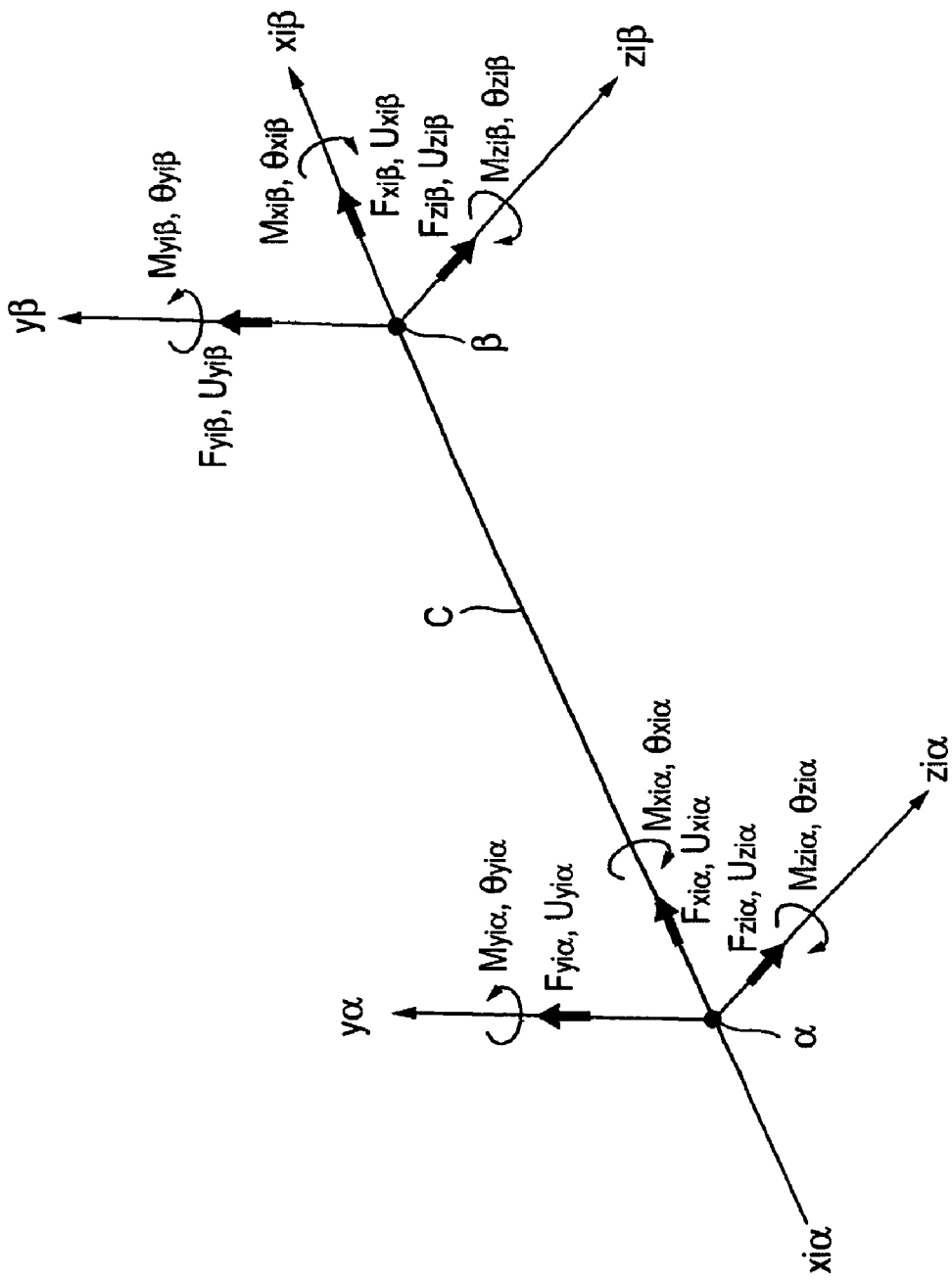
FIG. 4 is a drawing for describing the degree of freedom in the wire harness expressed by beam elements and nodes.
Figures 5A, 5B:
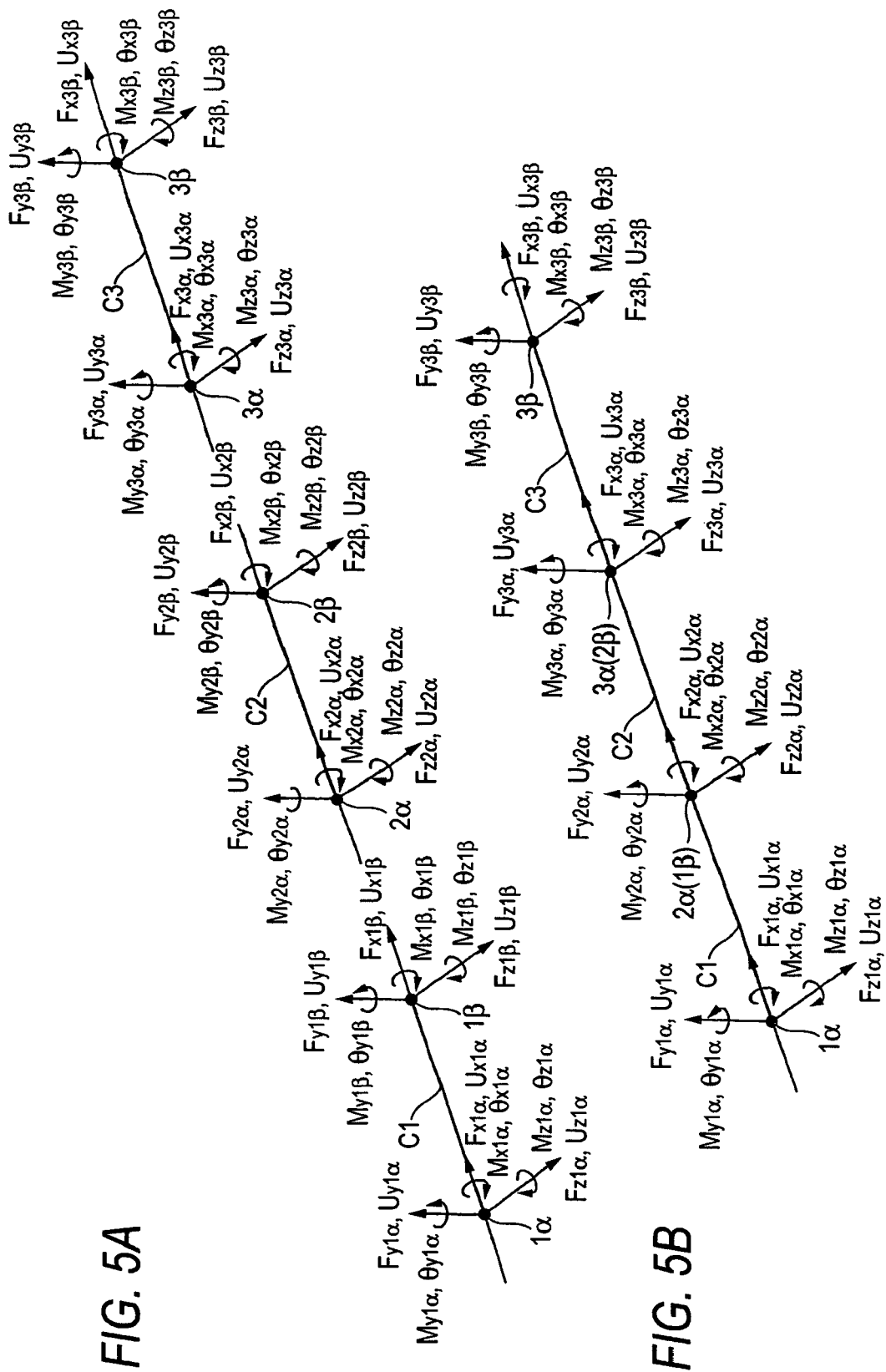
FIG. 5A is a drawing showing the wire harness by three beam elements.
FIG. 5B is a drawing showing the wire harness in which the three beam elements of FIG. 5A are combined together.

Referring then to FIG. 3 to FIG. 5, the outlines of the hypothetic conditions constituting the premises of the present invention, theories utilized and basic equations will now be described. FIG. 3A is a drawing showing an external view of a wire harness, FIG. 3B a drawing showing a discrete condition of the wire harness of FIG. 3A, and FIG. 3C a drawing representing the wire harness of FIG. 3A by beam elements and joints. FIG. 4 is a drawing for describing the degree of freedom in the wire harness represented by beam elements and joints. FIG. 5A is a drawing representing the wire harness by three beam elements, and FIG. 5B a drawing showing the condition of the three beam elements of FIG. 5A combined together.

First, according to the present invention, the following hypotheses are built up under use of the finite element method for designing the wire harness.

(1) It is assumed that the wire harness is made of an elastic body.
(2) It is assumed that the wire harness is a combination of beam elements.
(3) It is assumed that each beam element retains the linearity.

Setting the wire harness hypothetically as beam elements means that the wire harness is also set hypothetically as a uniform cross section, i.e. a homogeneous cross section. The cross section is assumed to be circular but it is not always necessary to assume the cross section in this manner. However, in the following statement, a description will be given with the cross section of the wire harness assumed to be circular.

When such a hypothesis is formed, the applying of the finite element method to the wire harness, which has not heretofore been applied thereto, becomes possible.

First, the wire harness is discretized. The wire harness formed by binding a plurality of electric wires 11 by an armoring material, such as a tape 12 as shown in FIG. 3A can be regarded as a continuous body. As shown in FIG. 3B, such a wire harness 1 is divided (discretized) into some beam elements C1, C2, C3, . . . . Namely, the wire harness is like one rope, so that the wire harness can be regarded as finite pieces of connected beam elements.

Therefore, as shown in FIG. 3C, the wire harness can be expressed as a combination of a plurality of beam elements C1, C2, C3, . . . connected to one another by a plurality of nodes N1, N2, N3, . . . . The characteristic values necessary for the beam elements are as follows.

Length l (refer to FIG. 3B)

Cross-sectional area A (refer to FIG. 3B)

Second moment of area I

Second polar moment of area J (also called torsional resistance coefficient)

Longitudinal elastic modulus E

Lateral elastic modulus G

In order to determine these values, a density $\rho$ and a Poisson's ratio $\mu$, etc. are also used, though they are not directly shown in these characteristic values.

In the specification of the present invention, the parameters concerning the physical properties directly determining an outer shape of a linear structure are called outer shape parameters, and the parameters concerning the physical properties other than the outer shape parameters, such as the second moment of area I, polar moment of area J, longitudinal elastic modulus E and lateral elastic modulus G, density $\rho$, Poisson's ratio $\mu$, etc. shall be called non-outer shape parameters.

As shown in FIG. 4, each beam element (C1, C2, C3, . . . ) has two nodes $\alpha$ and $\beta$. In the three-dimensional space, the node $\alpha$ has three translational components and three rotational components, so that the node has a total of six degrees of freedom. The same applies to the other node $\beta$. Therefore, the beam element C necessarily has twelve degrees of freedom.

Referring to the drawing, the following reference letters and symbols represent:

$F_{xi}$: Nodal force in an xi axial direction of i-th element $F_{yi}$: Nodal force in a yi axial direction of i-th element $F_{zi}$: Nodal force in a zi axial direction of i-th element $M_{xi}$: End moment around the xi axis of the i-th element (the right-handed screwing direction shall be a positive direction)

$M_{yi}$: End moment around the yi axis of the i-th element (the right-handed screwing direction shall be a positive direction)

$M_{zi}$: End moment around the zi axis of the i-th element (the right-handed screwing direction shall be a positive direction)

$U_{xi}$: Displacement in the xi direction of the i-th element
$U_{yi}$: Displacement in the yi direction of the i-th element
$U_{zi}$: Displacement in the zi direction of the i-th element
$\theta_{xi}$: Angular displacement around the xi axis of the i-th element (the right-handed screwing direction shall be a positive direction)

$\theta_{yi}$: Angular displacement around the yi axis of the i-th element (the right-handed screwing direction shall be a positive direction)

$\theta_{zi}$: Angular displacement around the zi axis of the i-th element (the right-handed screwing direction shall be a positive direction)

α represents a left side node, and the other β a right side node.

In the structural mechanics accompanying such a large deformation as that of a wire harness and the like, a balance equation of a finite element method is generally $$([K]+[K_G])\{x\}=\{F\} \quad (1)$$

wherein [K] is a general rigidity matrix, $[K_G]$ an overall geometric rigidity matrix, {x} a displacement vector, and {F} a load vector (also called a force vector).

However, since the equation (1) is algebraically a non-linear simultaneous equation, the equation cannot be solved as it is in a practical numerical analysis. Therefore, an incremental method in which a load value is fractionized and gradually added is necessarily employed (the same applies to a case where forced displacement occurs). In consequence, the balance equation (1) is also expressed by the following incremental system.

$$([K]+[K_G])\{\Delta x\}=\{\Delta F\}-\{R\} \quad (1)'$$

wherein {ΔF} is a value of load increment, {Δx} incremental deformation in an incremental step, and {R} a correction vector for a load vector.

In each incremental section, calculations are made with the balance equation regarded as a linear equation, and a balancing force ((vector {R} in the equation (1)')) occurring during this time is reduced to a level in a tolerance by a method of repetition before a subsequent step is taken. In a series of these algorithms, a known method, for example, a Newton-Raphson method and an arc length method are utilized.

When a forced displacement is designated as in the prediction of a shape, omitting the overall geometric rigidity matrix $[K_G]$ in a second item out of a left side of the balance equation, the results of a good quality are obtained in many cases. The overall geometric rigidity matrix is omitted in this case as well.

The overall rigidity matrix [K] in a first item of a left side of the balance equation is obtained by converting the rigidity matrix of each element, which is rewritten as the coordinate value is changed momentarily in each incremental step, into a coordinate value in an overall coordinate system, and aggregating the values thus obtained. The concrete content of expression of the element rigidity matrix forming a basis is shown in the following equation (2).

$$\begin{pmatrix} \frac{AE}{1} & 0 & 0 & 0 & 0 & 0 & -\frac{AE}{1} & 0 & 0 & 0 & 0 & 0 \\ 0 & \frac{12EI_z}{1^3} & 0 & 0 & 0 & \frac{6EI_z}{1^2} & 0 & -\frac{12EI_z}{1^3} & 0 & 0 & 0 & \frac{6EI_z}{1^2} \\ 0 & 0 & \frac{12EI_y}{1^3} & 0 & -\frac{6EI_y}{1^2} & 0 & 0 & 0 & -\frac{12EI_y}{1^3} & 0 & -\frac{6EI_y}{1^2} & 0 \\ 0 & 0 & 0 & \frac{GJ}{1} & 0 & 0 & 0 & 0 & -\frac{GJ}{1} & 0 & 0 \\ 0 & 0 & -\frac{6EI_y}{1^2} & 0 & \frac{4EI_y}{1} & 0 & 0 & 0 & \frac{6EI_y}{1^2} & 0 & \frac{2EI_y}{1} & 0 \\ 0 & \frac{6EI_z}{1^2} & 0 & 0 & 0 & \frac{4EI_z}{1} & 0 & -\frac{6EI_z}{1^2} & 0 & 0 & 0 & \frac{2EI_z}{1} \\ -\frac{AE}{1} & 0 & 0 & 0 & 0 & 0 & \frac{AE}{1} & 0 & 0 & 0 & 0 & 0 \\ 0 & -\frac{12EI_z}{1^3} & 0 & 0 & 0 & -\frac{6EI_z}{1^2} & 0 & \frac{12EI_z}{1^3} & 0 & 0 & 0 & -\frac{6EI_z}{1^2} \\ 0 & 0 & -\frac{12EI_y}{1^3} & 0 & \frac{6EI_y}{1^2} & 0 & 0 & 0 & \frac{12EI_y}{1^3} & 0 & \frac{6EI_y}{1^2} & 0 \\ 0 & 0 & 0 & -\frac{GJ}{1} & 0 & 0 & 0 & 0 & 0 & \frac{GJ}{1} & 0 & 0 \\ 0 & 0 & -\frac{6EI_y}{1^2} & 0 & \frac{2EI_y}{1} & 0 & 0 & 0 & \frac{6EI_y}{1^2} & 0 & \frac{4EI_y}{1} & 0 \\ 0 & \frac{6EI_z}{1^2} & 0 & 0 & 0 & \frac{2EI_z}{1} & 0 & -\frac{6EI_z}{1^2} & 0 & 0 & 0 & \frac{4EI_z}{1} \end{pmatrix} \begin{Bmatrix} U_{xi\alpha} \\ U_{yi\alpha} \\ U_{zi\alpha} \\ \theta_{xi\alpha} \\ \theta_{yi\alpha} \\ \theta_{zi\alpha} \\ U_{xi\beta} \\ U_{yi\beta} \\ U_{zi\beta} \\ \theta_{xi\beta} \\ \theta_{yi\beta} \\ \theta_{zi\beta} \end{Bmatrix} = \begin{Bmatrix} F_{xi\alpha} \\ F_{yi\alpha} \\ F_{zi\alpha} \\ M_{xi\alpha} \\ M_{yi\alpha} \\ M_{zi\alpha} \\ F_{xi\beta} \\ F_{yi\beta} \\ F_{zi\beta} \\ M_{xi\beta} \\ M_{yi\beta} \\ M_{zi\beta} \end{Bmatrix} \quad (2)$$

The condition of compatibility and that of equilibrium will now be described. As shown in FIG. 5A, the wire harness shall be expressed by three beam elements C1, C2, C3 for simplicity's sake. In this case, the quality of displacement of a node 1β of the beam element C1 and that of displacement of a node 2α of the beam element C2 become equal, and a force applied to these two nodes is also balanced. For the same reason, the quantities of displace ment of the node 2β of the beam element C2 and node 3α of a beam element C3 also become equal, and a force applied to these two nodes is also balanced. Therefore, owing to the continuity of the displacement and the satisfaction of the condition of equilibrium, the beam elements C1 and C2, and the beam elements C2 and C3 can be combined with each other as shown in FIG. 5B.

Referring to the drawings, the following reference letters and symbols represent:

$F_{xi}$: Nodal force in the xi axial direction of the i-th element
$F_{yi}$: Nodal force in the yi axial direction of the i-th element
$F_{zi}$: Nodal force in the zi axial direction of the i-th element
$M_{xi}$: End moment around the xi axis of the i-th element
$M_{yi}$: End moment around the yi axis of the i-th element
$M_{zi}$: End moment around the zi axis of the i-th element
$U_{xi}$: Displacement in the xi axial direction of the i-th element
$U_{yi}$: Displacement in the yi axial direction of the i-th element
$U_{zi}$: Displacement in the zi axial direction of the i-th element
$\theta_{xi}$: Angular displacement around the xi axis of the i-th element
$\theta_{yi}$: Angular displacement around the yi axis of the i-th element
$\theta_{zi}$: Angular displacement around the zi axis of the i-th element wherein i=1α, 1β, 2α, 2β, 3α, and 3β.

When the continuity of the displacement and the balance of force in the beam elements C1, C2 and C3 shown in FIG. 5B are shown in the same form as the above-mentioned equation (2), the following equation (3) is Not smaller than four beam elements can also be handled in the same manner. Thus, a mathematical model of a wire harness divided into an arbitrary number of beam elements can be made.

When the above equation (3) is expressed simply, it becomes $[K]\{x\}=\{F\}$ (4)

Therefore, a path, i.e. a predictive shape of the wire harness can be calculated by determining each element of the displacement vector $\{x\}$ on the basis of the above equations (3) and (4). The distortion, stress, a reaction force, moment and so forth can be calculated by determining a force vector $\{F\}$ in each node. The general matrix finite element method as mentioned above is also introduced in, for example, the above-mentioned in the publication "Matrix Finite Element Method".

One example of the method of determining a Poisson's ratio, a longitudinal elastic modulus and a lateral elastic modulus which are necessary for the prediction of the shape in the present invention will now be described below. FIG. 6A is a drawing showing the measurement of geometrical moment of inertia and a longitudinal elastic modulus, and FIG. 6B a drawing showing the measurement of a polar moment of area and a lateral elastic modulus.

First, an object wire harness is prepared, and the length I, a cross-sectional area A and a density ρ are determined with calipers, a measure, a gravimeter and the like. The values can then be obtained by simple calculations.

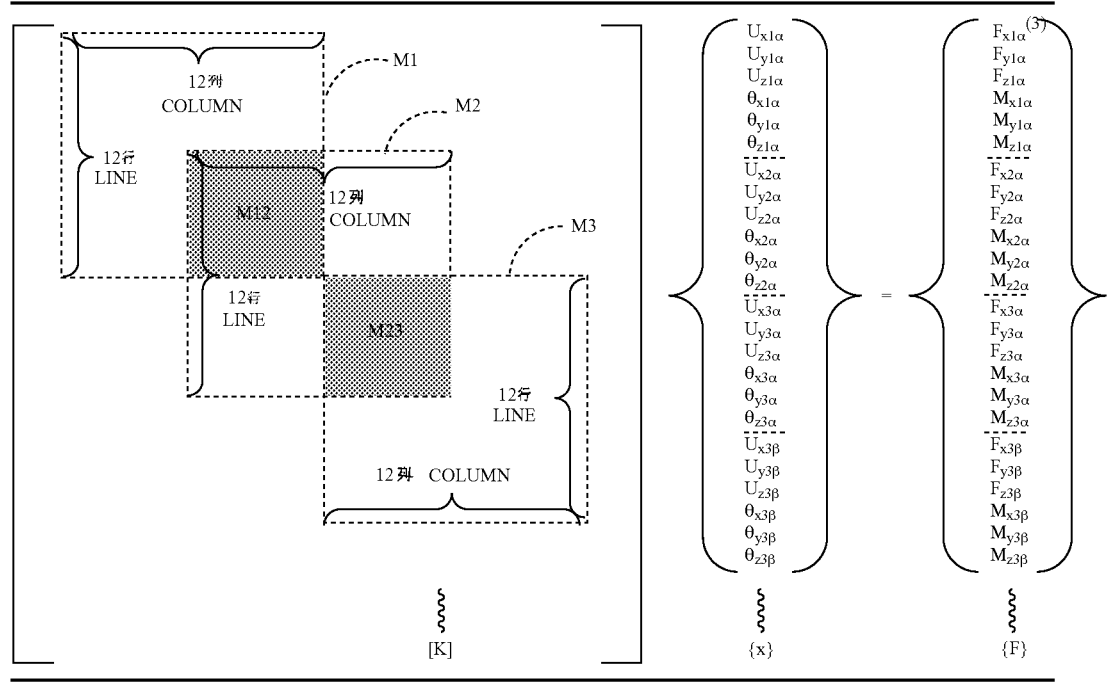

The matrixes M1, M2 and M3 on a line 12 and a column 12 in the equation (3) are the same as that shown in the above equation (2). However, the portions M12 and M23 in which the matrixes M1, M2 and M3 overlap each other are portions in which the structural elements of the matrixes are summed up.

When the longitudinal elastic modulus E is measured by using the measuring method shown in FIG. 6A, the result can be expressed by the following equation (5).

$$E=FL^3/3XI \quad (5)$$

The geometrical moment of inertia can be expressed by the following equation (6) since it was assumed that the wire harness had a circular cross section as mentioned above.

$$I = \pi D^4 / 64 \quad (6)$$

Therefore, the equation becomes:

$$E = 64FL^3 / 3X\pi D^4 \quad (7)$$

In this measurement, the longitudinal elastic modulus E can be determined by measuring the relation between F and x with $E = (F/X) \times (64L^3 / 3\pi D^4)$.

When the lateral elastic modulus G is determined by using the measuring method shown in FIG. 6B, the result can be expressed by the following equation (8).

$$G = (TL/\theta J) \times 2 \quad (8)$$

The polar moment of area J can be expressed by the following equation (9) since it was assumed that the wire harness had a circular cross section.

$$J = \pi D^4 / 32 \quad (9)$$

The torsional force becomes:

$$T = FS \quad (10)$$

Therefore, $$G = (32FSL/\theta\pi D^4) \times 2 = (F/\theta)(32SL/\pi D^4) \times 2 \quad (11)$$

Accordingly, the lateral elastic modulus G can be determined by measuring the relation between F and θ.

The lateral elastic modulus and longitudinal elastic modulus have the relation shown by the following equation (12).

$$G = E/2(1+\mu) \quad (12)$$

wherein μ is a Poisson's ratio.

The above-mentioned measuring method is an example, and each of the lateral elastic modulus G and longitudinal elastic modulus E may also be obtained by a method other than this example of the measuring method.

Figure 7:
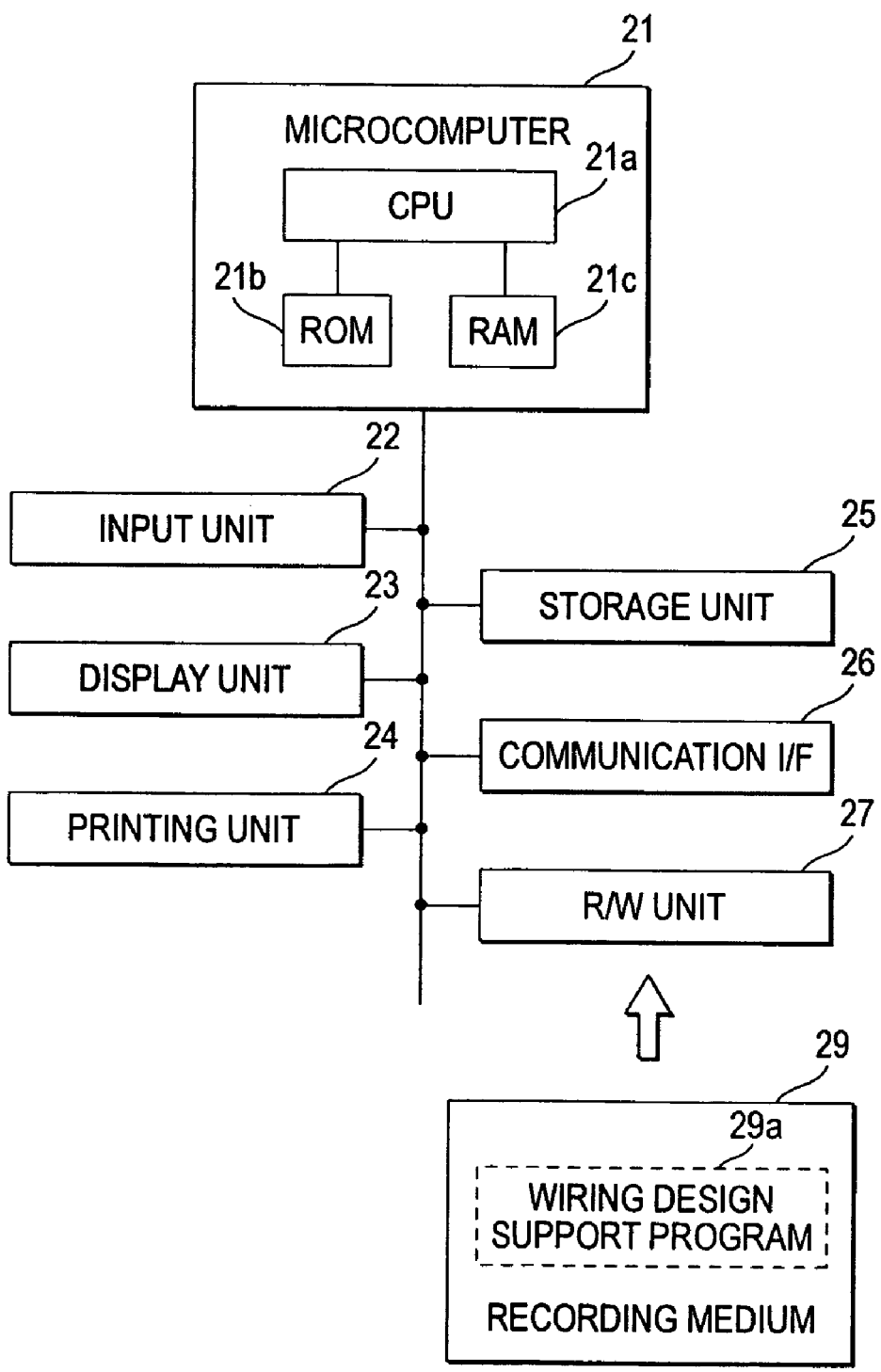
FIG. 7 is a block construction diagram showing an example of a hardware structure of the all embodiments.

The supporting of the design is then done by calculating a predictive shape of the wire harness in accordance with a processing procedure, which will be described later, by utilizing the above theory, basic equations and measurement values. The construction of the hardware in the present invention will be described. FIG. 7 is a block diagram showing the construction of the hardware in all of the modes of embodiments of the present invention.

As shown in FIG. 7, the apparatus according to the present invention includes a microcomputer 21, an input unit 22, a display 23, a printing unit 24, a storage 25, a communication interface 26 and a read/write unit 27. For example, a personal computer is used. Needless to say, a desk top computer and a supercomputer which are other than the personal computer may also be used. The microcomputer 21 includes a CPU 21a (Central Processing Unit), a ROM 21b for storing a boot program, etc., and a RAM 21c for temporarily storing the results of various kinds of processing operations. The input unit 22 is a keyboard, a mouse and the like for inputting the mentioned various values thereinto, the display 23 is a LCD, a CRT and the like for displaying the results of processing operations, and the printing unit 24 a printer for printing the results of processing operations.

The storage 25 stores an installed wiring design support program 29a, i.e. a hard disk drive for storing the results of a process based on this program 29a, while the communication interface 26 is a modem board and the like for making data communication between the communication interface and an external unit by using, for example, internet and a LAN circuit and the like. The read/write unit 27 is a device for reading the wiring design support program 29a stored in a recording medium 29, such as a CD and a DVD, and write the calculation results based on this wiring design support program 29a in the recording medium 29. These structural elements are connected together via an inner bus 28.

The microcomputer 21 installs the wiring design support program 29a read by the read/write unit 27 in the storage 25. When a power source is turned on, the microcomputer 21 is started in accordance with the boot program stored in the ROM 21B, and starts the installed wiring design support program 29a. The microcomputer 21 then carries out a process concerning the shape prediction in which consideration is given to multistage deformation, outputs the results of the process from the display 23 and printing unit 24 and stores the results of the process in the storage 25 and recording medium 29, in accordance with the wiring design support program 29a. The wiring design support program 29a can also be installed in other personal computer and the like which has the above-mentioned basic construction, and, after the program 29a is installed in such a personal computer, the computer is functioned as a wiring design support unit. The wiring design support program 29a may be a program provided via not only the recording medium 29 but also via a communication circuit, such as the internet and LAN.

A processing procedure according to the embodiment of the present invention will be described by using FIG. 8 and FIG. 9. FIG. 8 is a flow chart showing a processing procedure for a mode of embodiment of the present invention. FIG. 9A to FIG. 9D are drawings showing the deformation of a wire harness in each processing operation.

First, in a step S1 shown in FIG. 8, a finite element model corresponding to a wire harness, which is an object to be designed, is prepared by using the above-described method. Then, in a step S2, restriction conditions corresponding to an initial shape, outer parameters, non-outer parameters, etc. are set with respect to this finite element model. Then, in a step S3, a predictive shape according to such a set value and representing the physically balanced condition of the finite element model, i.e. an initial shape 1a shown in FIG. 9A is calculated. In a step S4, the initial shape 1a is outputted from the display 23 and the like. The step S1 corresponds to the finite element model preparation process and a finite element model preparation unit. The step S4 corresponds to the initial shape output process and an initial shape output unit.

The above description will be supplemented. The restriction kinds (complete restriction, rotary restriction, complete freedom, etc.) and coordinates corresponding to the initial shape and shown in FIG. 2 are set with respect to each of nodes 1a0 to 1a8. As the nodes 1a0 to 1a8, the portions of a wire harness to which support members, such as connectors, clips and the like are fixed are allotted. To set the restriction kinds, the names of support members, such as connector, fixed clip and the like may be utilized as shown in FIG. 2. The values set in this operation have relation with the elements in the displacement vector {x} in the above equation (3).

Especially, the nodes 1a4 and 1a8 are set as a first control point and a second control point forcibly displaced to predetermined displacement destinations (these nodes are handled in the same manner as the other nodes in the calculations of the initial shapes). The first control point and second control point are positions on the wire harness to which support members, for example, connectors and the like are fixed, and forcibly displaced during an assembling operation and fixed to predetermined portions of a vehicle.

To be more precise, a control point forcibly displaced first is called a first control point, and a control point forcibly displaced secondly a second control point. In the following description, the node 1a4 and the node 1a8 will be called in some cases the first control point 1a4 and the second control point 1a8 respectively.

In this embodiment, the initial shape 1a is set so that the initial shape corresponds to an object wire harness extended straight. The restriction conditions may be set so that the initial shape becomes some other shape. Wire harnesses are packaged in a container when they are delivered, for example, from a wire harness manufacturer to an automobile manufacturer. The initial shape of the wire harnesses differs depending upon how the wire harnesses are bent and placed in the container or how the wire harnesses were bent after they had been packaged therein. The initial shape on which the bend and distortion are reflected of a wire harness can be calculated and set on the basis of the above-mentioned restriction conditions. When such a bent initial shape is reflected as a starting point on a predictive shape in a later step, it becomes possible to calculate an initial shape 1a in conformity with the realities of the techniques.

In order to calculate the initial shape, the finite element method may not necessarily be utilized, and, for example, a minimum bend radius relied upon the material properties of the wire harness and a bend radius at which a worker can bend the wire harness by a normal level of force when the wire harness is attached to a vehicle may be used. In any case, it is preferable that an initial shape on which the shape of an object wire harness not yet attached to a vehicle is reflected be outputted. The above shape calculation process is carried out by the microcomputer 21, and the setting of each value is done by using the input unit 22, the display 23 and/or the printing unit 24 being used for out the outputting of the predictive shape. In a subsequent process onward, the shape calculation process is carried out by the microcomputer 21, and the input unit 22 is used for setting each value, the display 23 and printing unit 24 being used for outputting the calculation results.

The outer shape parameters set in the step S2 include the length I and cross sectional area A, and the non-outer shape parameters the geometrical moment of inertia I, polar moment of area J, Poisson's ratio $\mu$, density $\rho$, longitudinal elastic modulus E and lateral elastic modulus G. The values measured and determined in advance in the above-mentioned manner are utilized for these parameters. The values set in this process have relation with each element in the rigidity matrix [K] in the above equation (3). The outer shape parameters and non-outer parameters correspond to the physical properties. Various kinds of control values (not shown) having relation with this calculation are also set.

When the initial shape 1a is thus outputted, the first control point 1a4 is then forcibly displaced by a predetermined quantity in a step S5. This predetermined quantity can be set by dividing into a plurality of parts the through path in which the first control point 1a4 on the initial shape 1a reaches the displacement destination 1d4. Although the first control point 1a4 on the initial shape 1a may be forcibly displaced at a stroke to the displacement destination 1d4, displacing the control point by a predetermined quantity at a time makes it easy to grasp the condition of displacement of the wire harness.

In this process, the coordinates and kinds of restriction (complete restriction, rotary restriction, etc.) for a subsequent displacement destination are set as restriction conditions for the first control point 1a4. To be more precise, it is preferable that, when the first control point 1a4 is set to a point (intermediate point) other than the displacement destination 1d4, the kind of restrictions is set to complete restriction, and that, when the first control point 1a4 is set to the displacement destination 1d4, the kind of restrictions is set to complete restriction or rotary restriction correspondingly to a support member to be fixed to the first control point 1a4. When the kind of restrictions is set in the displacement destination correspondingly to the support member to be fixed to the first control point 1a4, the wiring design of a linear structure more in conformity with the realities of the techniques can be attained. The node 1a0 is set to, for example, complete restrictions, while other node including a second control point 1a8 is set to, for example, completely free. The outer shape parameters and non-outer shape parameters are left identical with the values thereof set in the step S2.

The process then advances to a step S6 and a step S7, and the calculating of a predictive shape corresponding to a set value and the outputting of the calculated predictive shape are done. In a step S8, the first control point 1a4 is judged as to whether the whole displacement thereof has been completed or not. When a judgment that the whole displacement of the first control point 1a4 has not yet been completed is given in the step S8, i.e., when a judgment that the first control point 1a4 has not yet reached (N in the step S8) the displacement destination 1d4 (N in the step S8) is given in the step S8, the operation is returned to the step S5, and the coordinates and kind of restrictions of a subsequent displacement destination are set as the restriction conditions for the first control point 1a4. The other values to be set are as mentioned above. The step S6 corresponds to the predictive shape calculation step and a predictive shape calculation unit, and the first predictive shape calculation step and a first predictive shape calculation unit.

Such processes in the step S5 to the step S7 are repeated in the step S8 until a judgement that the whole displacement of the first control point 1a4 has been completed is given, i.e., until a judgement that the first control point 1a4 has reached the displacement destination is given (Y in the step S8). Owing to this repetition of the processes, the displacement shown in FIG. 9B of the initial shape 1a to the first predictive shape 1d via the intermediate shapes 1b, 1c is outputted from the display 23 and the like. Therefore, this method is effective for not only the wiring design but also for the discussion of the procedure for the operation. Referring to the drawing, the nodes 1d1, 1d2, 1d3, 1d4, 1d5, 1d6, 1d7 and 1d8 on the first predictive shape 1d correspond to those 1a1, 1a2, 1a3, 1a4, 1a5, 1a6, 1a7 and 1a8 on the initial shape 1a. When the nodes are shown on the display 23, it is preferable that the connectors and the like fixed to the nodes be also displayed at once.

When the first predictive shape 1d is thus outputted, the second control point 1d8 (obtained by displacing the second control point 1a8 on the initial shape 1a) on the first predictive shape 1d is now forcibly displaced by a predetermined quantity in a step S9. This predetermined quantity can be determined by dividing a through path in which the second control point 1d8 on the first predictive shape 1d8 reaches the displacement destination 1z8 into a plurality of parts as shown in, for example, FIG. 9C. In this process, the second control point 1d8 may also be forcibly displaced at a stroke to the displacement destination 1z8. However, when the second control point 1d8 is displaced by a predetermined quantity at a time, it becomes easy to grasp the progress of the displacement of the wire harness.

As the restriction conditions for the second control point 1d8, the coordinates and kinds of restrictions (complete restrictions, rotary restrictions, etc.) for a subsequent displacement destination are set. To be more precise, it is preferable that, when the second control point $1d8$ is set to a position (intermediate position) other than the displacement destination $1z8$, the kind of restrictions is set to complete restrictions, and that, when the second control point $1d8$ is set to the displacement destination $1z8$, the kind of restrictions is set to complete restrictions or rotary restrictions by making the kind of restrictions correspond to the support member to be fixed the second control point $1d8$. This enables the wiring design of a linear structure in conformity with the realities of the techniques to be attained.

The node $1a0$ is set to, for example, complete restrictions, while the nodes other than the first control point $1a4$ and second control point $1d8$ are set to, for example, completely free condition. Regarding the first control point $1a4$, the kind of restrictions (complete restriction, rotary restriction, etc.) corresponding to the support member to be fixed to this control point is set as described above, and the coordinates of the same control point are set to a value corresponding to the displacement destination $1d4$ thereof. The outer shape parameters and non-outer shape parameters shall remain to have values set in the step S2.

The process then advances to a step 10 and a step S11, and the calculating of a predictive shape corresponding to a set value and the outputting of the calculated predictive shape are done in the same manner as in the step S3 and step S4, and the step S6 and step S7. In a step S12, the second control point $1d8$ is judged as to whether the whole displacement thereof has been completed or not. When a judgment that the whole displacement of the second control point $1d8$ has not yet been completed, i.e. a judgment that the second control point $1d8$ has not yet reached the displacement destination $1z8$ is given in the step S12 (N in the step S12), the process returns to the step S9. In this step S9, the coordinates and the kind of restriction of a subsequent displacement destination are set as the restriction conditions for the second control point $1d8$. The other set values are as described above. The step S10 corresponds to the predictive shape calculation process and a predictive shape calculation unit, and the second predictive shape calculation process and a second predictive shape calculation unit.

Such processes in the step S9 to the step S11 are repeated until a judgment that the whole displacement of the second control point $1d8$ has been completed in the step S12 is given, i.e., until a judgment that the second control point $1d8$ has reached the displacement destination $1z8$ (Y in the step S12) is given. Owing to this repetition, the progress of the displacement the first predictive shape $1d$ to the second predictive shape $1z$ via intermediate shapes $1e$, $1f$ is outputted from the display 23 as shown in FIG. 9C.

When a judgment that the process in the step S9 to step S11 is indicative of the arrival of the second control point $1d8$ at the displacement destination $1z8$ is given in the step S12 (Y in the step S12), the process advances to a step S13, and the second predictive shape $1z$ is outputted as a final predictive shape from the display 23 and the like as shown in FIG. 9D. Referring to the drawing, the nodes $1z1$, $1z2$, $1z3$, $1z4$, $1z5$, $1z6$, $1z7$ and $1z8$ on the final predictive shape $1z$ correspond to the nodes $1a1$, $1a2$, $1a3$, $1a4$, $1a5$, $1a6$, $1a7$ and $1a8$ on the initial shape $1a$. When the second predictive shape is shown on the display 23, it is preferable that connectors, etc. fixed to the nodes are also displayed at the same time. In this process, the second predictive shape $1z$ is set as the final predictive shape. However, when the node $1z2$ and the like are thereafter forcibly displaced, the second predictive shape may be considered as an intermediate shape. The step S13, and the step S7 and step S11 correspond to the result outputting step and a result outputting unit.

Thus, according to the mode of embodiment of the present invention, the progress of the initial shape reaching a final shape via shapes deformed in a multistage can be accurately grasped, and the wiring design of a linear structure, such as a wire harness in conformity with the realities of the techniques can be attained.

Figure 10A:
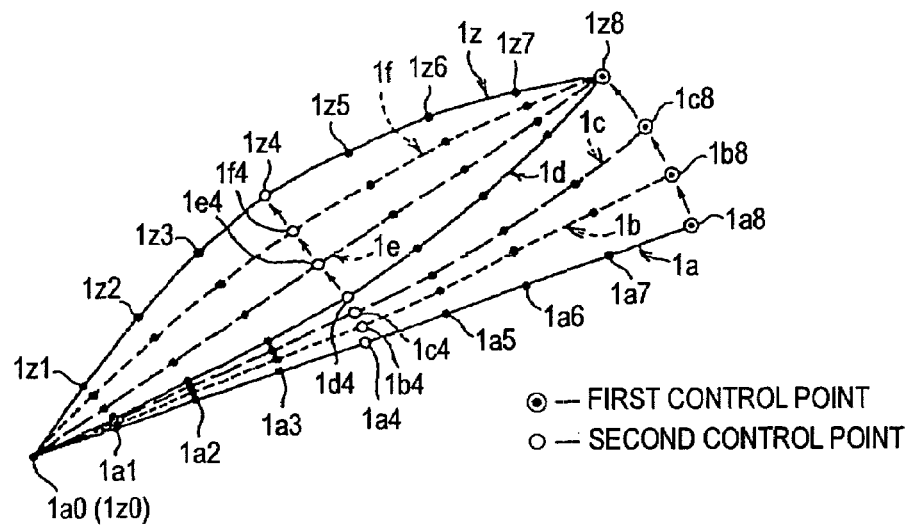
FIG. 10A and FIG. 10B are drawings for describing the modified examples of the present invention.
Figure 10B:
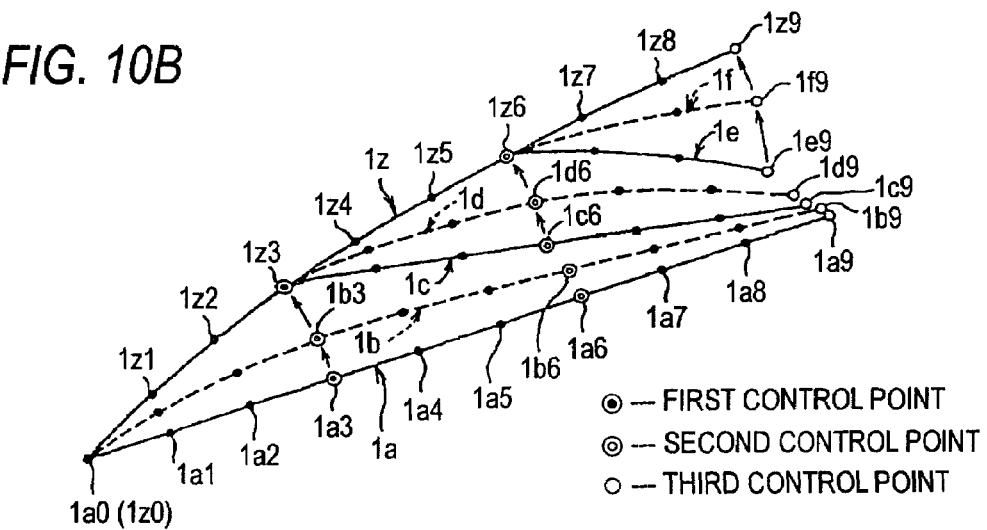

Besides the above-described mode of embodiment illustrated in FIG. 8 and FIG. 9, the following modified examples, etc. are conceivable. FIGS. 10A and 10B are drawings for describing the modified examples of the present invention. For example, as shown in FIG. 10A, the positional relation between a first control point and a second control point on an initial shape $1a$ may be reversed with respect to that in the above-described mode of embodiment as shown in, for example, FIG. 10A. In the above-described embodiment, the intermediate portion of the wire harness is first forcibly displaced, and the condition of the deformation of the end sections thereof are then forcibly displaced, the resultant condition of the deformed wire harness being then calculated. In this modified example, the first control point $1a8$ on the end portions of the wire harness is first forcibly displaced, and the second control point $1a4$ on the intermediate portion is then forcibly deformed, the resultant condition of the deformed wire harness being calculated.

When the first control point $1a8$ on an end portion is forcibly displaced to $1b8$, $1c8$, $1z8$ as shown in FIG. 10A with the second control point $1d4$ (displaced from $1a4$) on the intermediate portion then forcibly displaced to a final predictive shape $1z$ via $1e4$, $1f4$, $1z4$, the progress of the initial shape $1a$ displaced to the final predictive shape $1z$ via intermediate shapes $1b$, $1c$, $1d$, $1e$, $1f$ is outputted from a display 23. Referring to the drawing, the nodes $1z1$, $1z2$, $1z3$, $1z4$, $1z5$, $1z6$, $1z7$ and $1z8$ on the final predictive shape $1z$ correspond to those $1a1$, $1a2$, $1a3$, $1a4$, $1a5$, $1a6$, $1a7$ and $1a8$ on the initial shape $1a$. The other set values and procedure for processes shall be in accordance with those in the mode of embodiment shown in FIG. 8. This enables the wiring design of a linear structure made on the assumption that the displacement of the wire harness includes various kinds of operations to be attained.

As some other modified example, not smaller than three control points, for example, a first control point $1a3$, a second control point $1a6$ and a third control point $1a9$ may be set on an initial shape $1a$ as shown in FIG. 10B. The first control point $1a3$ is forcibly displaced to $1b3$ and $1z3$ as shown in FIG. 10B, and a second control point $1c6$ (displaced from $1a6$) is then forcibly displaced to $1d6$, $1z6$. When a third control point $1e9$ (displaced from $1a9$) is further displaced to $1f9$, $1z9$, the progress of the initial shape $1a$ displaced to a final predictive shape $1z$ via intermediate shapes $1b$, $1c$, $1d$, $1e$, $1f$ is shown on a display 23. Referring to the drawing, the nodes $1z1$, $1z2$, $1z3$, $1z4$, $1z5$, $1z6$, $1z7$, $1z8$ and $1z9$ on the final predictive shape $1z$ correspond to those $1a1$, $1a2$, $1a3$, $1a4$, $1a5$, $1a6$, $1a7$, $1a8$ and $1a9$ on the initial shape $1a$. The other set values and a procedure for the process shall be in accordance with those in the mode of embodiment shown in FIG. 8. This enables the wiring design of a linear structure in conformity with the realities of the techniques to be attained.

In all of the modes of embodiment described by using FIG. 9 and FIG. 10 are made on the assumption that the gravity is imparted to the wire harness from the upper side to the lower side thereof (for example, when the wire harness is wired on a door of a vehicle). Therefore, a set value corresponding to the gravity is applied to a finite element model, and then shape-calculated. Of course, when a case where the gravity is not imparted to the wire harness is assumed (for example, when a wire harness is wired on a flat floor), a set value corresponding to the gravity becomes unnecessary, so that the predictive shapes become slightly different from those shown in FIG. 9 and FIG. 20. The present invention can be applied to any of these cases.

In the above-described mode of embodiment, the example of calculation of predictive shapes based on the forcible displacement is shown. This example can also be applied to the prediction of shape in a case where a wire harness is deformed as a force is applied to a predetermined node. The above description is given with a wire harness, which is wired as a linear structure 97 in the interior of a vehicle, as an example. Needless to say, the present invention can be applied in the same manner to not only such a wire harness but also a hose and a tube having a construction simpler than that of the wire harness and wired outside a vehicle, or a general electric wire and a single electric wire as well. Namely, the linear structures to which the present invention is applied include a hose, a tube, a general electric wire, a single electric wire and the like. The present invention can also be applied to a wire harness having branch lines, and similar harnesses. The present invention can also be applied in the same manner not only to linear structures of a circular cross section but also to linear structures of a rectangular cross section, an annular cross section, an elliptic cross section, an H-shaped cross section and a similar cross section. Namely, the cross-sectional shape of the linear structures to which the present invention is applied is not limited to a circular shape.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2004-067054 filed on Mar. 10, 2004, the content of which is incorporated herein for reference.

What is claimed is:

1. A method of supporting an optimum wiring design of a linear structure, comprising:
   setting an initial shape of the linear structure;
   providing a finite element model of the linear structure, the finite element model being formed as an elastic body having a plurality of combined beam elements which retain linearity;
   setting a physical property and restriction conditions of the linear structure to the finite element model;
   calculating a predictive shape of the finite element model which is in a physically balanced condition based on the physical property and the restriction conditions; and
   outputting a calculation result of the calculating process of the predictive shape,
   wherein the calculating process of the predictive shape includes:
      calculating a first predictive shape in which a forced displacement destination of a first control point on the finite element model corresponding to the initial shape is set as one of the restriction conditions; and
      calculating a second predictive shape in which a forced displacement destination of a second control point, which is different from the first control point, on the finite element model corresponding to the first predictive shape is set as one of the restriction conditions.

2. The method as set forth in claim 1, wherein the calculating process of the second predictive shape is performed under the first control point is completely restricted or rotationally restricted to the forced displacement destination.

3. The method as set forth in claim 1, wherein the calculating process of the predictive shape further includes:
   calculating a third predictive shape in which a forced displacement destination of a third control point, which is different from any of the first control point and the second control point, on the finite element model corresponding to the second predictive shape is set as one of the restriction conditions.

4. The method as set forth in claim 1, wherein the first control point and the second control point are displaced gradually by a predetermined quantity at a time toward the respective forced displacement destinations.

5. The method as set forth in claim 3, wherein the first control point, the second control point and the third control point are displaced gradually by a predetermined quantity at a time toward the respective forced displacement destinations.

6. A supporting apparatus for supporting an optimum wiring design of a linear structure, comprising:
   a first setting unit which sets an initial shape of the linear structure;
   a providing unit which provides a finite element model of the linear structure, the finite element model being formed as an elastic body having a plurality of combined beam elements which retain linearity;
   a second setting unit which sets a physical property and restriction conditions to the finite element model of the linear structure;
   a calculating unit which calculates a predictive shape of the finite element model which is in a physically balanced condition based on the physical property and the restriction conditions; and
   an outputting unit which outputs a calculation result of the calculating process of the predictive shape,
   wherein the calculating unit calculates a first predictive shape in which a forced displacement destination of a first control point on the finite element model corresponding to the initial shape is set as one of the restriction conditions, and calculates a second predictive shape in which a forced displacement destination of a second control point, which is different from the first control point, on the finite element model corresponding to the first predictive shape is set as one of the restriction conditions.

7. A computer-readable recording medium for causing a computer to execute the method of supporting an optimum wiring design of a linear structure set forth in any one of claims 1 to 5.

* * * * *